United States Patent
Neha et al.

(10) Patent No.: US 11,544,593 B2
(45) Date of Patent: Jan. 3, 2023

(54) DATA ANALYSIS AND RULE GENERATION FOR PROVIDING A RECOMMENDATION

(71) Applicant: International Business Machines Corporation, Armonk, NY (US)

(72) Inventors: Neha, Bangalore (IN); Manjula Golla Hosurmath, Bangalore (IN); Rahul Reddy Ravipally, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 439 days.

(21) Appl. No.: 16/736,652

(22) Filed: Jan. 7, 2020

(65) Prior Publication Data
US 2021/0209485 A1   Jul. 8, 2021

(51) Int. Cl.
  *G06F 17/00*   (2019.01)
  *G06N 5/04*   (2006.01)
  (Continued)

(52) U.S. Cl.
  CPC ............ *G06N 5/04* (2013.01); *G06F 16/36* (2019.01); *G06N 20/00* (2019.01)

(58) Field of Classification Search
  CPC ....... G06F 16/36; G06F 16/3334; G06N 5/04; G06N 20/00; G06N 3/084
  See application file for complete search history.

(56) References Cited

U.S. PATENT DOCUMENTS

2010/0332430 A1* 12/2010 Caraviello ............. G16B 20/20
                                                                 706/47
2017/0091313 A1*  3/2017 Chalabi ................. G06F 16/958
(Continued)

FOREIGN PATENT DOCUMENTS

CN           106776711 A      5/2017

OTHER PUBLICATIONS

Ali Mamdouh Elkahky et al., A Multi-View Deep Learning Approach for Cross Domain User Modeling in Recommendation Systems. Proceedings of the 24th International Conference on World Wide Web. International World Wide Web Conferences Steering Committee, 278-288, < https://doi.org/10.1145/2736277> Aug. (Year: 2015).*

(Continued)

*Primary Examiner* — Greta L Robinson
(74) *Attorney, Agent, or Firm* — Konrad Raynes Davda & Victor LLP; Janaki K. Davda

(57) ABSTRACT

Provided are techniques for data analysis and rule generation for providing a recommendation. Current features are identified from data in a corpus. In response to receiving an indication that the data has changed, a new feature is identified. A feature set is created by identifying one or more related features of the current features. A feature worthiness score for the feature set is generated. In response to the feature worthiness score exceeding a threshold, the feature set is input to a model. One or more rules from the model are received, where each of the one or more rules includes the one or more related features, the new feature, and a recommendation. In response to receiving a set of values for the one or more related features and the new feature, a rule of the one or more rules is applied to provide the recommendation for that set of values.

20 Claims, 17 Drawing Sheets

(51) Int. Cl.
*G06F 16/36* (2019.01)
*G06N 20/00* (2019.01)

(56) References Cited

U.S. PATENT DOCUMENTS

| | | | |
|---|---|---|---|
| 2017/0161637 A1 | 6/2017 | Misra et al. | |
| 2018/0315494 A1* | 11/2018 | Koide | G16H 10/60 |
| 2018/0349514 A1* | 12/2018 | Alzate Perez | G06F 16/90332 |
| 2019/0348178 A1* | 11/2019 | Eleftherou | G16H 10/60 |

OTHER PUBLICATIONS

Carmela Comito et al. Aclinical decision support framework for automatic disease diagnoses. Proceedings of the 2019 IEEE/ACM International Conference on Advances in Social Networks Analysis and Mining. Association for Computing Machinery, 933-936, < https://doi.org/10.1145/3341161.3343509>, Aug. (Year: 2019).*

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing" dated Sep. 2011, Recommendations of the National Institute of Standards and Technology, Computer Security Division Information Technology Laboratory National Institute of Standards and Technology, Total 7 pages.

Machine Translation for CN106776711A, published May 31, 2017, Total 17 pages.

Atzmueller et al.,"Rule-Based Information Extraction for Structured Data Acquisition Using TEXTMARKER" dated 2008, Total 7 pages.

Lopez-Sanchez et al., "Automating Decision Making to Help Establish Norm-Based Regulations", dated May 2017, 16th International Conference on Autonomous Agents and Multiagent Systems, Total 3 pages.

Kraken, "Bring the Power of AI and Machine Learning to the Business User" (online) retrieved from the Internet on Jan. 7, 2020 at URL> https://www.bigsquid.com/kraken-platform, Total 13 pages.

\* cited by examiner

```
                                                    ┌─ 500
┌──────────────────────────────────────────────────┐
│ TESTING FOR DISEASE ABC                          │
│                                                  │
│ There are two types of disease ABC               │
│ 1) Latent infection                              │
│ 2) Full disease                                  │
│                                                  │
│ There is a skin test for disease ABC             │
│                                                  │
│ There is a blood test for disease ABC            │
│                                                  │
│ There are many symptoms. One may be a cough.     │
│ Another may be weight loss. In some cases,       │
│ there are night sweats. There may also be        │
│ fever.                                           │
└──────────────────────────────────────────────────┘
```

Doctor Report

Doctor Name: Dr. Neha

Patient Name: Mr. X

Age: 30

Details:
    Infant – No
    Child – No
    Pregnant – No

Symptoms: fever, night sweats, cough, weight loss

Lab Tests:
    Disease ABC test
    HEG resistance test

Lab Report: Yes

Recommendation: Start medication

FIG. 6

Lab Report:

Patient Name: Mr. X

Age: 30

Lab Test Results:
  Disease ABC test    detected medium
  HEG resistance test    detected Interpretation:

| Disease ABC | HEG Resistance | Remarks |
|---|---|---|
| Detected | Detected | Disease ABC detected |
| Not detected | Not detected | Disease ABC not detected |
| Detected | Not detected | Disease ABC detected |
| Detected | Indeterminate | Need more data |
| Indeterminate | Indeterminate | Disease ABC not detected |

FIG. 7

Automatically Generated Rules (Patterns):

| | Fever | Night Sweats | Cough | Weight Loss | HEG resistance | Disease ABC | Recommendation |
|---|---|---|---|---|---|---|---|
| 0 | Yes | No | Yes | No | Not Detected | Not Detected | Disease ABC not detected |
| 1 | Yes | Yes | Yes | Yes | Detected | Detected Medium | Disease ABC detected |
| 2 | Yes | No | Yes | No | Indeterminate | Indeterminate | Disease ABC not detected |
| ... | | | | | | | |

FIG. 8

| | Travel Type | Travel Purpose | Travel Restriction | Billable | Estimated cost | Local Skill | Customer | Role of Person | Revenue | Deal Closure Time | Recommendation |
|---|---|---|---|---|---|---|---|---|---|---|---|
| 1 | Cust | Deal | | Y | | | | | | | Approve |
| 2 | Cust | Deal | WW | N | | | | | | | Get WW Approval first |
| 3 | Cust | Deal | Low | N | | | High | Critical | High | Next Q | Approve |
| 4 | Cust | Deal | Low | N | | | Low | Critical | High | Next Q | Approve |
| 5 | Cust | Deal | Low | N | | | High | Critical | High | Next Q | Approve |
| 6 | Cust | Deal | Low | N | | | High | Critical | High | Next Q | Approve |
| 7 | Cust | Deal | Low | N | | | High | Critical | High | Next Q | Approve |
| 8 | Cust | Deal | Low | N | | | High | Critical | High | Next Q | Approve |
| 9 | Cust | Deal | Low | N | | | High | Critical | High | Next Q | Approve |
| 10 | Cust | Deal | Low | N | | Y | Low | Important | Low | Long term | Use Local Skills |

FIG. 9

DATA ANALYSIS AND RULE GENERATION FOR PROVIDING A RECOMMENDATION

BACKGROUND

Embodiments of the invention relate to data analysis and rule generation for providing a recommendation.

A comma separated values file may be manually prepared by a subject matter expert after researching documents (including articles, policies, and chat transcripts) for features that affect the decision of whether or not to approve travel of an employee and whether or not to make another recommendation (e.g., using local skills instead of traveling). The comma separated values file includes information, such as, travel type, travel purpose, etc., along with a recommendation.

SUMMARY

In accordance with certain embodiments, a computer-implemented method is provided for data analysis and rule generation for providing a recommendation. The computer-implemented method comprises operations. Current features are identified from data in a corpus. In response to receiving an indication that the data has changed, a new feature is identified. A feature set is created by identifying one or more related features of the current features. A feature worthiness score for the feature set is generated. In response to the feature worthiness score exceeding a threshold, the feature set is input to a model. One or more rules from the model are received, where each of the one or more rules includes the one or more related features, the new feature, and a recommendation. In response to receiving a set of values for the one or more related features and the new feature, a rule of the one or more rules is applied to provide the recommendation for that set of values.

In accordance with other embodiments, a computer program product is provided for data analysis and rule generation for providing a recommendation. The computer program product comprises a computer readable storage medium having program code embodied therewith, the program code executable by at least one processor to perform operations. Current features are identified from data in a corpus. In response to receiving an indication that the data has changed, a new feature is identified. A feature set is created by identifying one or more related features of the current features. A feature worthiness score for the feature set is generated. In response to the feature worthiness score exceeding a threshold, the feature set is input to a model. One or more rules from the model are received, where each of the one or more rules includes the one or more related features, the new feature, and a recommendation. In response to receiving a set of values for the one or more related features and the new feature, a rule of the one or more rules is applied to provide the recommendation for that set of values.

In accordance with yet other embodiments, a computer system is provided for data analysis and rule generation for providing a recommendation. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Current features are identified from data in a corpus. In response to receiving an indication that the data has changed, a new feature is identified. A feature set is created by identifying one or more related features of the current features. A feature worthiness score for the feature set is generated. In response to the feature worthiness score exceeding a threshold, the feature set is input to a model. One or more rules from the model are received, where each of the one or more rules includes the one or more related features, the new feature, and a recommendation. In response to receiving a set of values for the one or more related features and the new feature, a rule of the one or more rules is applied to provide the recommendation for that set of values.

BRIEF DESCRIPTION OF THE SEVERAL VIEWS OF THE DRAWINGS

Referring now to the drawings in which like reference numbers represent corresponding parts throughout:

FIG. 5 illustrates unstructured data of a fact file in accordance with certain embodiments.

FIG. 6 illustrates semi-structured data of a doctor's transcript in accordance with certain embodiments.

FIG. 7 illustrates structured data of a lab report in accordance with certain embodiments.

FIG. 8 illustrates a recommendation structure with rules and recommendations for a medical context in accordance with certain embodiments.

FIG. 9 illustrates a recommendation structure with rules and recommendations for a travel context in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the invention relate to data analysis and rule generation for providing a recommendation. In particular, embodiments of the invention relate to dynamically extracting the data points of a process for making a decision using structured, semi-structured, and unstructured data, and updating a model pertaining to any change. The model may be a machine learning model.

Figure 1:
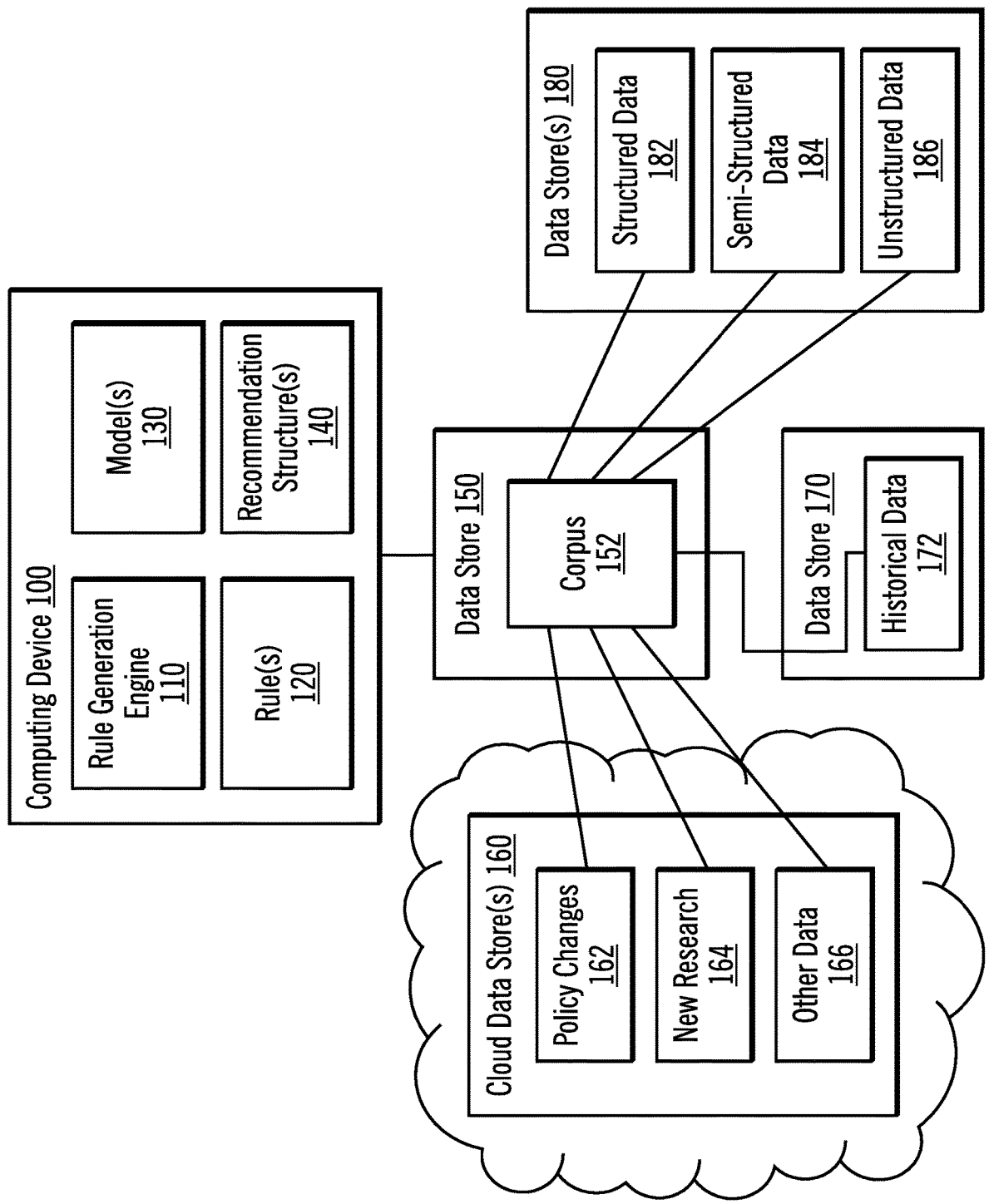
FIG. 1 illustrates, in a block diagram, a computing environment in accordance with certain embodiments.

FIG. 1 illustrates, in a block diagram, a computing environment in accordance with certain embodiments. A computing device 100 includes a rule generation engine 110, one or more rules 120, one or more models 130, and one or more recommendation structures 140. The computing device 100 is connected to a data store 150 that stores a corpus 152. In certain embodiments, the corpus 150 stores different types of data in documents or files. The corpus 150 includes data from one or more cloud data stores 160, from data store 170, and one or more data stores 180. The one or more cloud data stores 160 store policy changes 162 (e.g., documents with changes to a policy for treating a disease), new research 164 (e.g., articles on a new treatment for the disease), and other data 166 (e.g., patient records for patients who have the disease). The data store 170 stores historical data 172 (data available before the current time). The one or more data stores 180 store structured data 182 (e.g., spreadsheets), semi-structed data 184 (e.g., lab reports for patients), and unstructured data 186 (e.g., from documents, blogs, articles, comments about articles on-line, etc.).

In certain embodiments, the rule generation engine 110 analyzes the corpus 152 to generate the one or more rules 120 and the one or more recommendation structures 140. In certain embodiments, the rule generation engine 110 uses a model 130 to generate the one or more rules 120. In certain embodiments, a recommendation structure 140 is a table with a recommendation column and columns for features and with values of the features in rows of the table that are associated with a recommendation. In certain embodiments, the values may be null or empty for a particular row and/or column. Then, the one or more rules 120 may be used to provide recommendations. In certain embodiments, a rule 120 takes the form of one or more features (parameters or conditions) and one or more recommendations. If the values of the one or more features match the values of a rule in the recommendation structure, then a recommendation is provided. In certain embodiments, each row of the table may be described as a rule or pattern that may be used to locate a recommendation based on values in that row.

The rules generation engine 110 dynamically extracts data points for a process by learning and understanding about the subject from structured, semi-structured, and unstructured data automatically. The rules generation engine 110 extracts the feature data points automatically for any decision-making process. The rules generation engine 110 handles new features and updates the entire process with the new features.

The rules generation engine 110 builds the corpus 152 based on historical data 172 and derives datasets based on features by crawling and mining structured data 182, semi-structured data 184, and unstructured data 186 (e.g., literature) related to the domain (i.e., a context, such as a travel context, a medical context, etc.). Each feature set has a feature worthiness score based on relevance (e.g., how relevant the feature set is to a particular domain), ranking (e.g., a feature set found in more documents has a higher ranking and ranking is relative to other feature sets), and rating (e.g., an individual, absolute value for a feature set, which is not relative). In certain embodiments, the relevance, ranking, and rating for a feature may be automatically calculated and, optionally, may be adjusted by an administrator and may be changed at any time.

Based on different triggers, the rules generation engine 110 augments the corpus 152 along with augmenting the feature worthiness score that is derived based on different trigger points (e.g., new research, a policy change, etc.). In certain embodiments, starting with a dataset, significant features that are found are used to create a feature set.

The rules generation engine 110 identifies feature compatibility using continuous learning, which helps in capturing new features and is used in further analysis and fine-tuning the technique for processing for new datasets. The rules generation engine 110 also performs rule (e.g., pattern) derivation based on factors, such as, heredity (e.g., for a disease that may be inherited) and local parameters (e.g., parameters specific to a region for personalization, such as geographic features and temporal features) based on a sequence of events and historical events to dynamically calculate the feature worthiness score. With embodiments, the feature worthiness score is context driven and varies based on real-time context. The context may be described as an area of analysis (e.g., a travel context, a medical context, a particular disease context, etc.). In certain embodiments, each of the rules includes the features and provides a recommendation based on the values of the features.

The rules generation engine 110 has the ability to identify an anomaly for new feature identification, that is not part of the corpus 152 or the feature worthiness score is too low for a particular context. The rules generation engine 110 drives context associated with a new feature by crawling through new discoveries or policy changes. Then, the rules generation engine 110 builds the context of new features and augments the corpus 152 with the feature set on the basis of ranking, rating, and relevance. The entire process of re-augmenting features with their updated weights is an iterative process.

Figure 2:
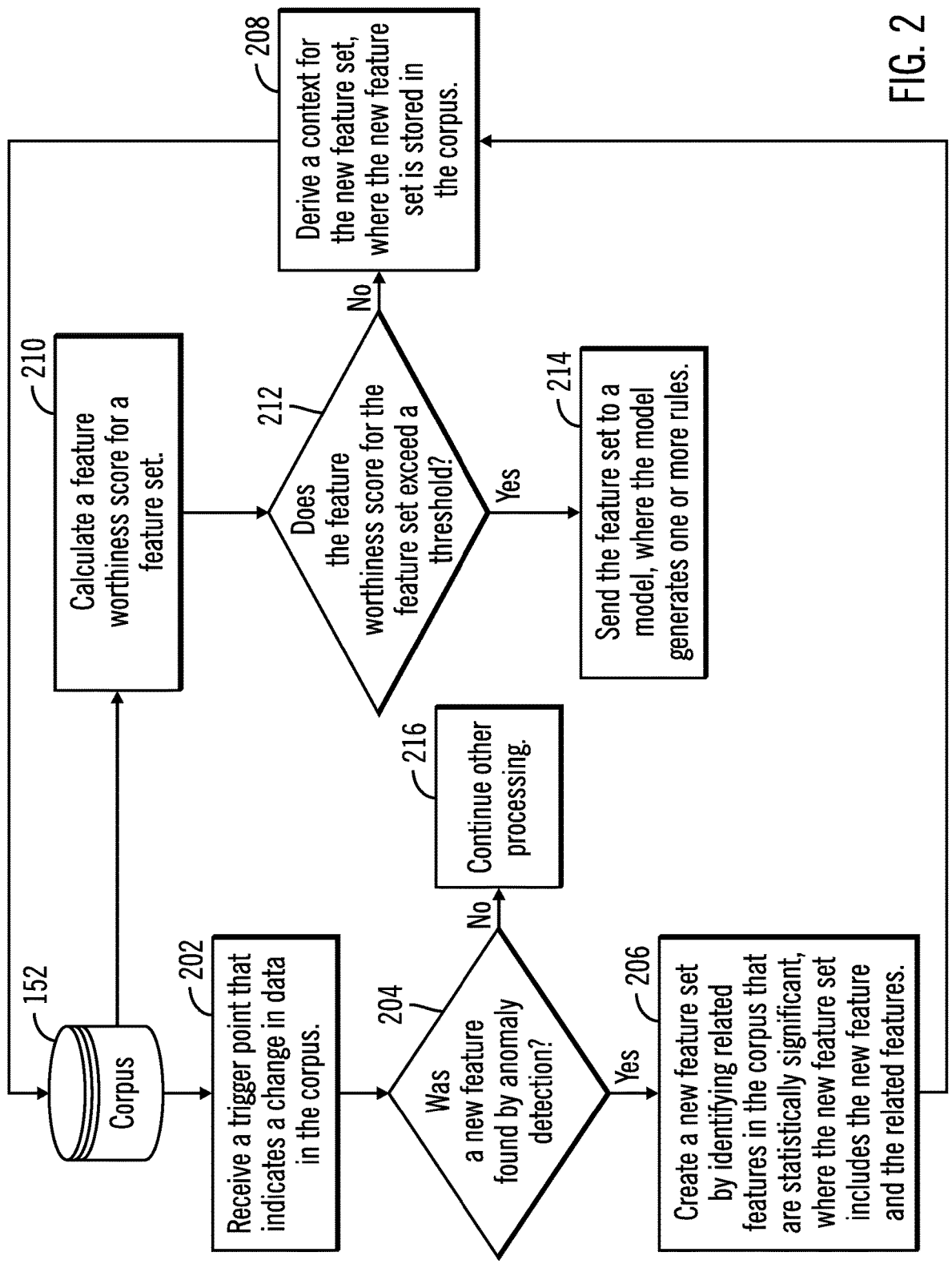
FIG. 2 illustrates operations for analyzing data for a context in accordance with certain embodiments.

FIG. 2 illustrates operations for analyzing data for a context in accordance with certain embodiments. The rules generation engine 110 performs real time augmentation of data curation (e.g., selecting, organizing, and managing the features found in the data of the corpus) per context. Therefore, the processing of FIG. 2 may occur for different contexts.

In block 202, the rules generation engine 110 receives a trigger point that indicates a change in data of the corpus 152. For example, if there is new research or a new policy, then the processing of FIG. 2 is triggered. In block 204, the rules generation engine 110 determines whether a new feature was found by anomaly detection (e.g., comparing a most recent (prior) version of the corpus with a current, updated version of the corpus to find what is new). If a new feature was found, processing continues to block 206, otherwise processing continues to block 216. In block 216, other processing is performed.

In block 206, the rules generation engine 110 creates a new feature set by identifying related features in the corpus that are statistically significant, where the new feature set includes the new feature and the related features. In certain embodiments, there are features in the data of the corpus, and embodiments create a feature set with a subset of these features that are related to the new feature. For example, the new feature may be a disease, and the related features are about the disease (e.g., treatment options). In certain embodiments, the rules generation engine 110 crawls the data in the corpus 152 for related features (e.g., data about patients with that disease and articles about that disease). This is done until enough data is found to determine that the relationship between the new feature for the disease and the other features is statistically significant. Statistically significant may be described as indicating that the relationship was not found by chance.

In block 208, the rules generation engine 110 derives a context for the new feature set, where the feature set is stored in the corpus with the context. Thus, the context is associated with the feature set. When processing moves from block 206 to block 208, the new feature set includes the new feature and the other, related features. Once the feature set is stored in the corpus, the rules generation engine 110 initiates the processing of block 210.

In block 210, the rules generation engine 110 calculates a feature worthiness score for a feature set (FS1, FS2, . . . FSn). The feature set may be the feature set created in block 206 or another feature set in the corpus. In certain embodiments, the rules generation engine 110 calculates the relevance, ranking, and rating for each feature in the feature set to obtain an individual feature score for that feature, and sums the individual feature score of each feature to generate a feature worthiness score of the feature set. In certain embodiments, the rules generation engine 110 calculates the feature worthiness score for the feature set of block 208. In other embodiments, the rules generation engine 110 identifies a possible feature set and calculates the feature worthiness score for that feature set. In certain embodiments, features with low feature worthiness scores are not omitted from a feature set, but are not given priority for the current context. The feature worthiness score is re-calculated when the context changes.

In block 212, the rules generation engine 110 determines whether the feature worthiness score for the feature set exceeds a threshold. If so, processing continues to block 214, otherwise, processing continues to block 208.

In block 214, the rules generation engine 110 sends the feature set to a model 130, where the model 130 generates one or more rules.

Figure 3A:
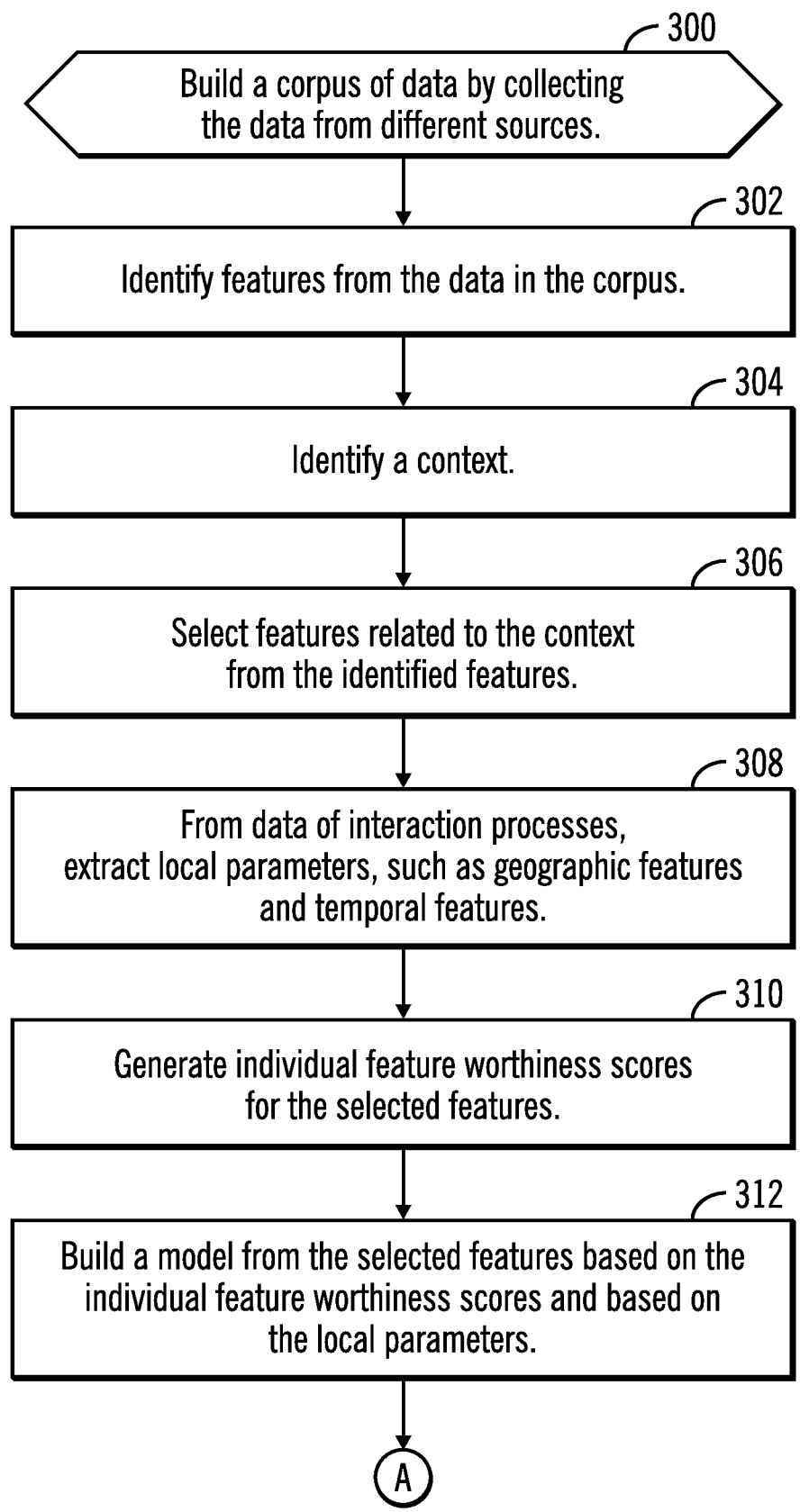
FIGS. 3A, 3B, and 3C illustrates, in a flowchart, operations for a training phase, a testing phase, and a post-deployment phase in accordance with certain embodiments.
Figure 3B:
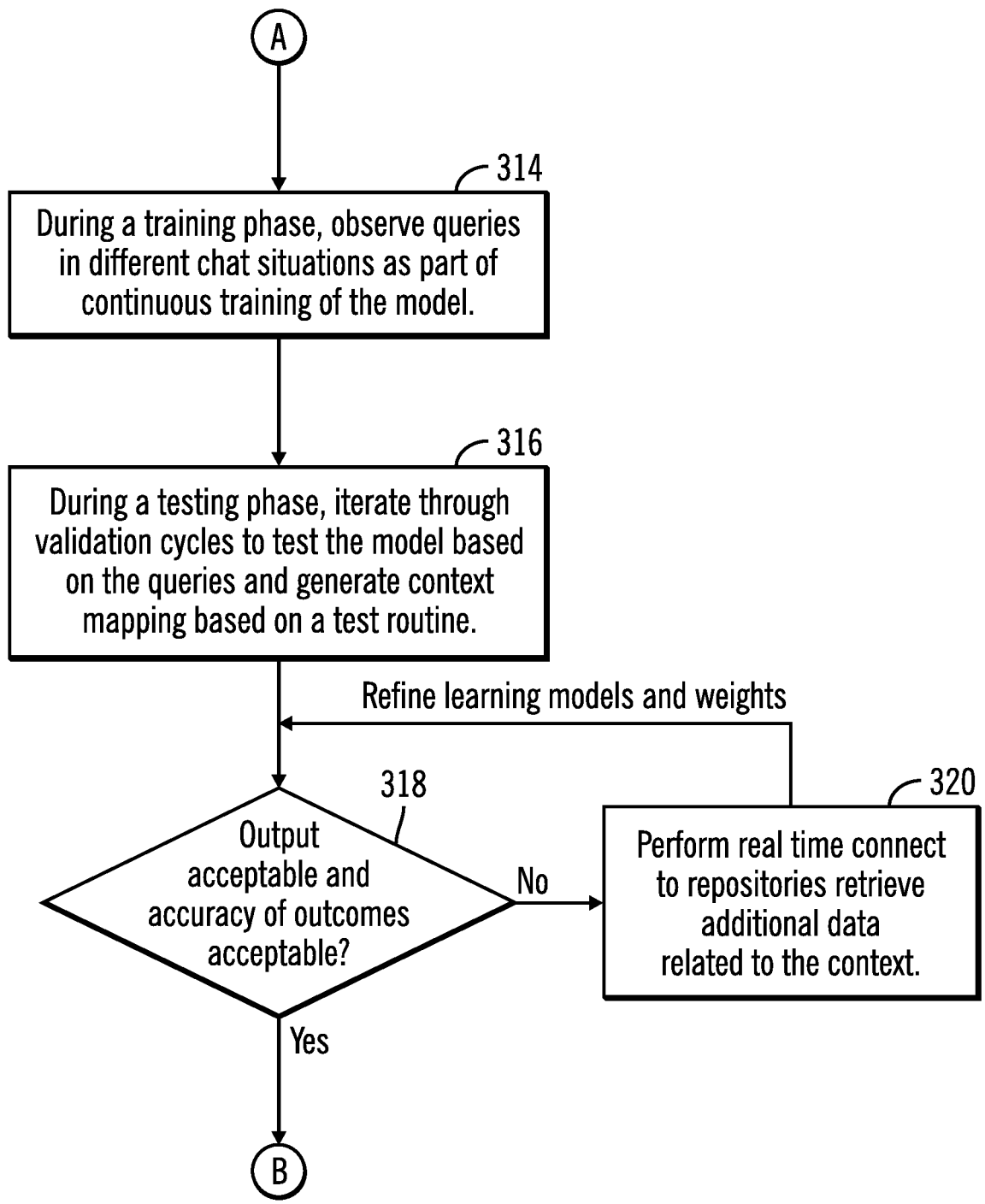
Figure 3C:
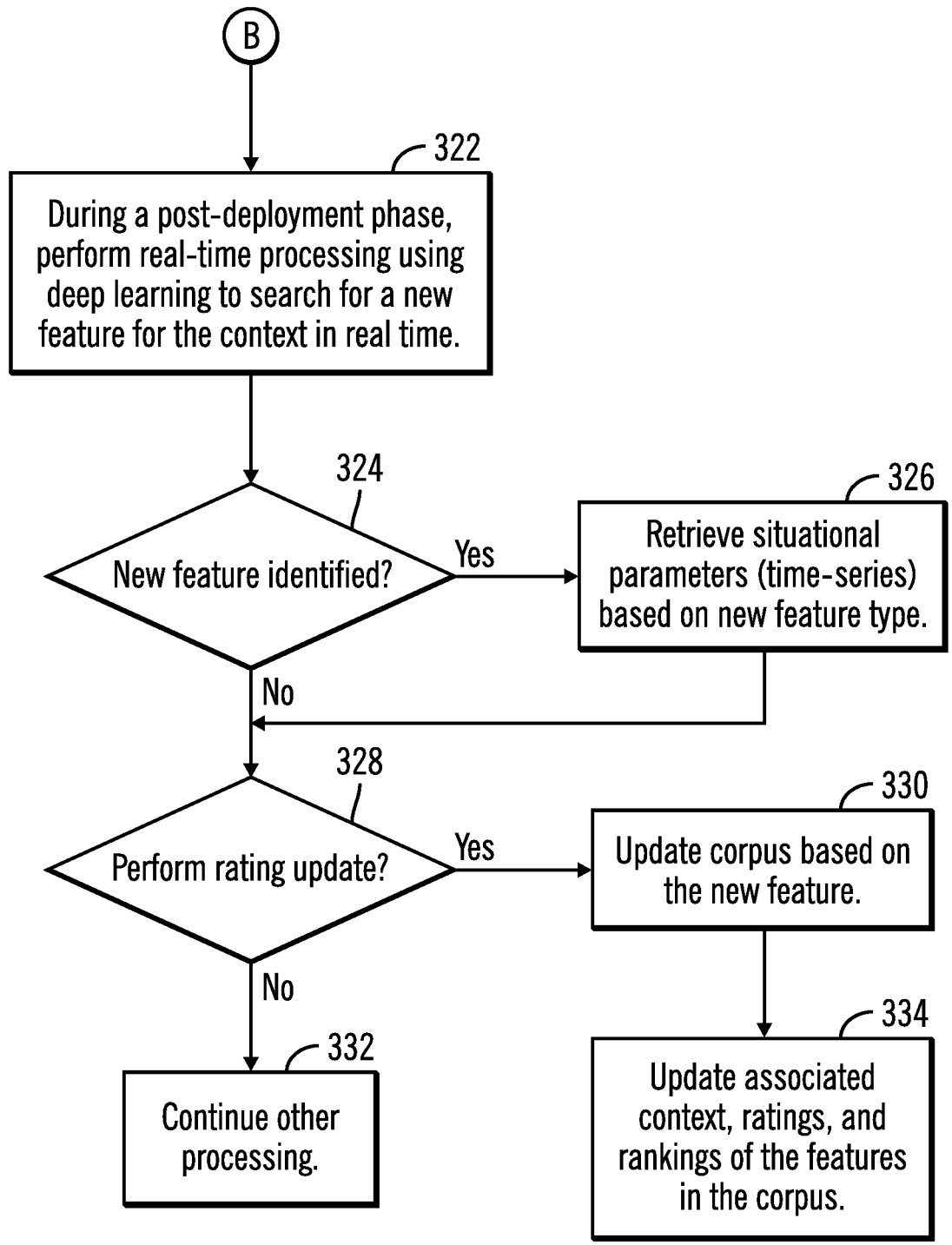

FIGS. 3A, 3B, and 3C illustrates, in a flowchart, operations for a training phase, a testing phase, and a post-deployment phase in accordance with certain embodiments. Control begins at block 300 with the rule generation engine 110 building a corpus of data by collecting the data from different sources, such as one or more cloud data stores 160, from data store 170, and one or more data stores 180.

In block 302, the rule generation engine 110 identifies features from the data in the corpus 152. In certain embodiments, key word extraction is used to identify the features. In certain embodiments, the extraction of features is based on concepts/entities leveraging machine learning techniques, such as, natural language classification, entity relation vectors, etc.

In block 304, the rule generation engine 110 identifies a context. In certain embodiments, the context is based on data of interaction processes (e.g., data from a chat transcript or other interaction data). In additional embodiments, the context may be specified to build a model for that context. As an example, for a domain of healthcare, a subject may be cancer, a subject matter expert may be an oncologist, and a context may be symptoms of the cancer. In this manner, the context is related to the domain, subject, and subject matter expert.

In block 306, the rule generation engine 110 selects features related to the context from the identified features. In certain embodiments, the rule generation engine 110 uses a context mapping that indicates that certain features or terms are associated with certain contexts (e.g., a feature of heart disease may be associated with the heart disease symptoms context).

In block 308, from the data of interaction processes, the rule generation engine 110, extracts local parameters, such as geographic features and temporal features. In certain embodiments, the identification of geographic features and temporal features is based on learning techniques, such as, deep convolution or recurrent networks, to track sequential behavior.

In block 310, the rule generation engine 110 generates individual feature worthiness scores for the selected features. Each feature worthiness score is based on relevance (e.g., how relevant the feature set is to a particular domain), ranking (e.g., a feature set found in more documents has a higher ranking and ranking is relative to other feature sets), and rating (e.g., an individual, absolute value for a feature set, which is not relative). Thus, embodiments generate absolute feature worthiness scores and relative feature worthiness scores for the selected features. In certain embodiments, from the data of the interaction processes, the rule generation engine 110 derives a user (e.g., a user identifier), a query type (e.g., types of queries submitted by the user during the chat), and the context (e.g., of the chat) to generate both the absolute and relative feature worthiness scores. In certain embodiments, the feature worthiness score for a feature set is the sum of the individual feature worthiness scores for the features in the feature set.

In block 312, the rule generation engine 110 builds a model from the selected features based on the individual feature worthiness scores and based on the local parameters. The model is able to provide personalized recommendations based on the local parameters. From block 312 (FIG. 3A), processing continues to block 314 (FIG. 3B).

In block 314, during a training phase, the rule generation engine 110, observes queries in different chat situations as part of continuous training of the model. In block 316, during a testing phase, the rule generation engine 110, iterates through validation cycles (e.g., checking whether the feature sets are valid for the context) to test the model 130 based on the queries and generates a context mapping based on one or more test routines.

In block 320, the rule generation engine 110 determines whether the output of the model 130 is acceptable. In certain embodiments, this includes determining whether the accuracy of the outcomes is acceptable. If so, processing continues to block 322 (FIG. 3C), otherwise, processing continues to block 320.

In block 320, the rule generation engine 110 performs real time connect to the data stores 160, 170, 180 based on the context to retrieve additional data related to the context and processing loops back to block 318. This processing includes refining the model by, for example, adjusting weights. In certain embodiments, the model uses one or more techniques, such as backward propagation, to refine connection weights that result in activation of specific outputs.

In block 322, during a post-deployment phase, the rule generation engine 110, performs real-time processing using deep learning to search for a new feature (e.g., an outlier) for the context in real time.

In block 324, the rule generation engine 110 determines whether a new feature (e.g., an outlier) was identified. If so, processing continues to block 326, otherwise, processing continues block 328. The new feature may be identified using various factors and techniques, such as timestamping of data, relevance scores, anomaly detection, etc. In certain embodiments, the new feature is identified based on time-stamping, context, and a relevance score (which is a factor of the feature worthiness score).

In block 326, the rule generation engine 110 retrieves situational parameters (i.e., time-series data) pertaining to the specific situation (e.g., a change in policy) based on the new feature type.

In block 328, the rule generation engine 110 determines whether it is time to perform a ratings update (e.g., based on acquiring new data in the corpus, the context changing, etc.). If so, processing continues to block 330, otherwise, processing continues to block 332. In block 332, the rule generation engine 110 performs other processing.

In block 330, the rule generation engine 110 updates the corpus 152 based on the new feature (e.g., a new policy change, new research, etc.). In block 332, the rule generation engine 110 updates associated context, ratings, and rankings of the features in the corpus. In certain embodiments, the features related to the context are updated.

Figure 4A:
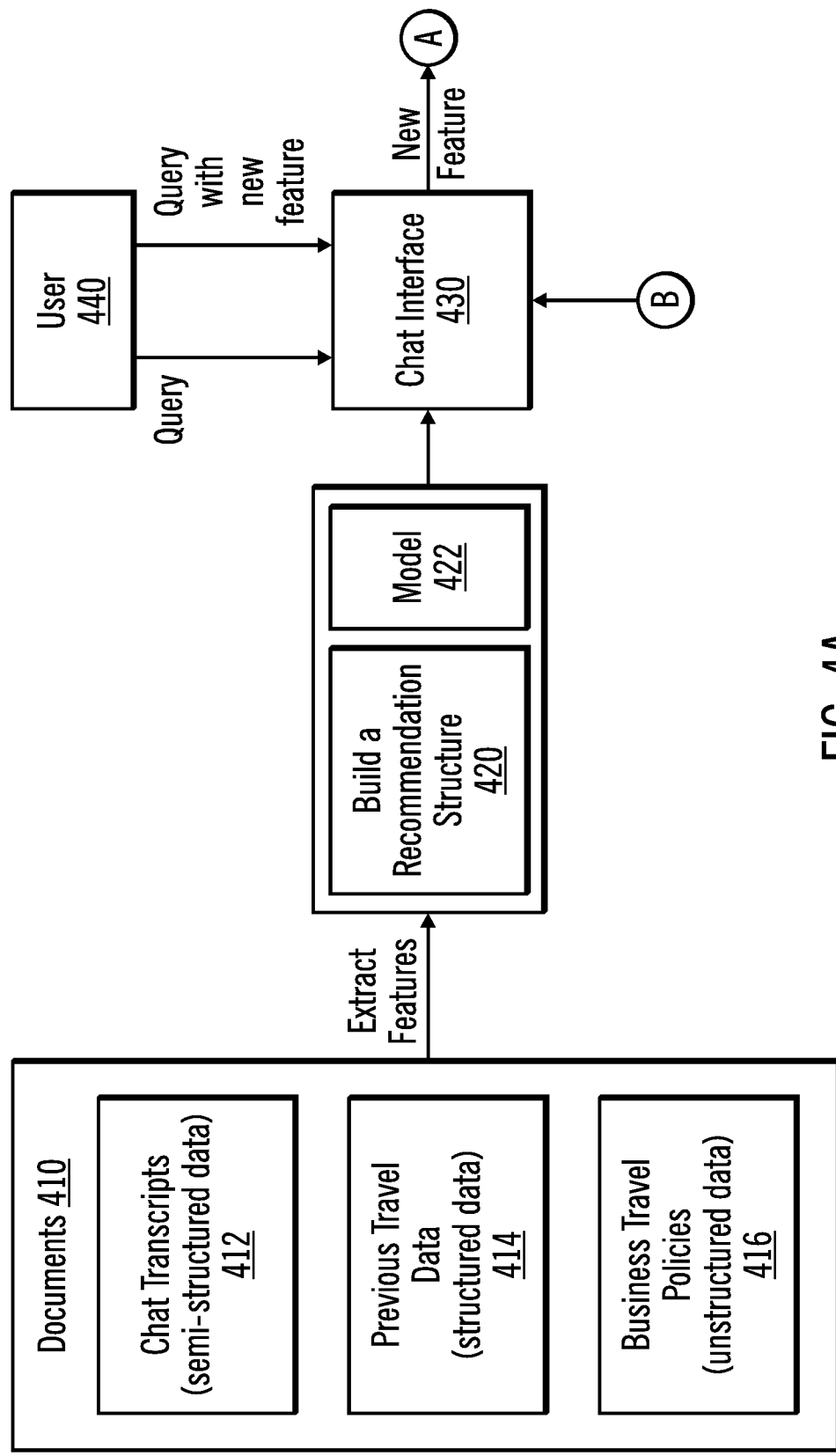
FIGS. 4A and 4B illustrates, in a process flow, operations for creating key-value pairs in accordance with certain embodiments.
Figure 4B:
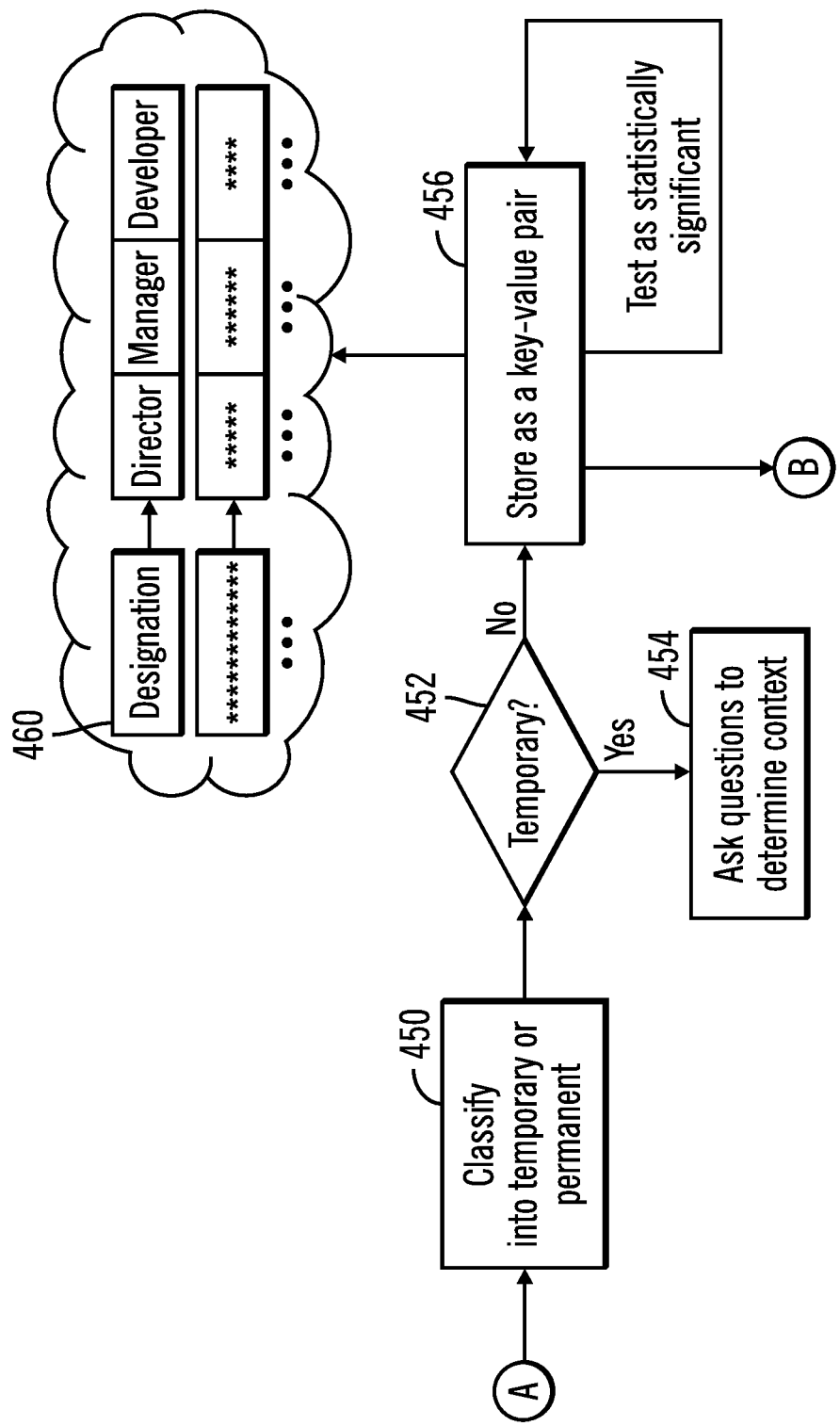

FIGS. 4A and 4B illustrates, in a process flow, operations for creating key-value pairs in accordance with certain embodiments. The key-value pairs are feature sets. In FIG. 4, documents 410 include chat transcripts (semi-structured data) 412, previous travel data (structured data) 414, and travel policies (unstructured data) 416. The rule generation engine 110 extracts features from the documents and builds a recommendation structure 420 (e.g., a table), which is sent to a model 422 (i.e., a decision support system).

A chat interface 430 may receive any combination of one or more queries (without new features) or one or more queries with new features from a user 440. If a query has a new feature, processing continues to block 450 (FIG. 4B). In block 450, the rule generation engine 110 classifies the new feature into temporary or permanent. The classification into temporary or permanent may be based on different factors that indicate whether the new feature is likely to be permanent (e.g., a symptom of a disease may occur frequently and is classified as permanent). In block 452, the rule generation engine 110 determines whether the new feature has been classified as temporary. If so, processing continues to block 454, otherwise, processing continues to block 456. In block 454, the rule generation engine 110 asks questions about the context (e.g., default questions and/or nearest questions). In block 456, the rule generation engine 110 stores the key-value pair for the new feature, as it has been classified as permanent. For example, the key-value pair 460 has a designation, which may have a value of director, manager or developer.

FIGS. 5, 6, 7, and 8 illustrate an example merely to enhance understanding. Embodiments are not intended to be limited to this example.

This is an example of recommendations in the healthcare domain. A doctor's recommendation to treat a patient may take into consideration many of the following information: age, weight, blood pressure, symptoms, lab results, reports, any known illnesses, family medical history, current medication, and more depending on the situation or previous treatment history.

A doctor who is a specialist deals with varied cases every day. It is difficult to remember the record of every patient and every case the doctor comes across on a daily basis. This makes it difficult to audit a recommendation and give a personalized consultation as all the information may not be available in one place. With embodiments, a recommendation structure may assist in giving proper care to a patient or to get a second opinion as all information leading to the recommendation is available in one place.

Embodiments provide a recommendation or a decision-support table that the rule generation engine 110 forms by mining different types of documents (e.g., lab reports, doctors' transcripts, etc.) and curates the mined information in one place, which may aid the doctor in making more informed decisions about patients.

FIG. 5 illustrates unstructured data of a fact file in accordance with certain embodiments. The rule generation engine 110 extracts possibly symptoms (i.e., cough, weight loss, night sweats, fever) from the fact file, each of which, in turn, may be used as feature column names in the recommendation structure.

FIG. 6 illustrates semi-structured data of a doctor's transcript 600 in accordance with certain embodiments. The rule generation engine 110 extracts the following features from the doctor's transcript 600:

1. Symptoms (i.e., fever, night sweats, cough, weight loss)
2. Lab report available (i.e., Yes to indicate that a lab report is available for one or more lab tests) (note that a No indicates that no lab tests were given or that no lab report is available)
3. Lab test names, if lab test feature is yes. (i.e., Disease ABC test, HEG resistance test)
4. Recommendation (start medication)

FIG. 7 illustrates structured data of a lab report 700 in accordance with certain embodiments. In this case, the doctor's transcript indicated yes for the lab report feature, so the rule generation engine 110 locates the lab report and extracts the required test names and the corresponding result (i.e., Disease ABC test—detected medium, HEG resistance test—detected medium).

FIG. 8 illustrates a recommendation structure 800 with rules and recommendations for a medical context in accordance with certain embodiments. The rule generation engine 110 extracts features of symptoms as keys from the fact file 500 and compares the symptoms with the symptoms in the doctor's transcript 600. If the rule generation engine 110 finds that the symptoms match, then the corresponding value of the feature is YES, otherwise, the corresponding value of the feature is NO.

The rule generation engine 110 also checks whether the lab report is YES or NO from the doctor's transcript 600. If YES, then the rule generation engine 110 extracts the lab test names and the recommendation. If NO, then, the rule generation engine 110 extracts the recommendation. In addition, if the Lab Test is YES, the rule generation engine 110 extracts the lab test names and results from the lab report. With this, the rule generation engine 110 generates the recommendation structure 800. Each column indicates a feature for the rule, and each row provides values for the features, where a particular set of values for the features is associated with a recommendation. For example, for the values of the features of row zero, the disease ABC is not detected.

Thus, the rule generation engine 110 automates the process of generating rules using dynamically extracted data points.

Continuing with the example, the rule generation engine 110 finds that "a user is experiencing from leg pain" (a new feature), and the recommendation structure 800 does not list leg pain. However, for this example, many people with disease ABC have leg pain. The doctor checks whether the leg pain is permanent or temporary. If the leg pain is temporary, nothing further is done. However, if the leg pain is permanent, the rule generation engine 110 updates the data point. In particular, the rule generation engine iteratively keeps validating this feature until it is statistically signification (e.g., leg pain is found as follows in reviewing documents for the disease ABC: yes, no, yes, yes, etc. The rule generation engine 110 will add leg pain as a new feature once leg pain for the disease ABC is statistically significant.

FIG. 9 illustrates a recommendation structure 900 with rules and recommendations for a travel context in accordance with certain embodiments. In certain embodiments, the rule generation engine 110 may automatically create the recommendation structure 900 after researching documents, policies, and chat transcripts for features that affect the decision of whether or not to approve travel of an employee and whether or not to make another recommendation (e.g., using local skills instead of traveling). In certain embodiments, the rule generation engine 110 may provide the data of the recommendation structure 900 in a comma separated values file. The columns of the recommendation structure 900 provide features, and the rows indicate the set of values for the features that result in the recommendation for that row.

Figure 10:
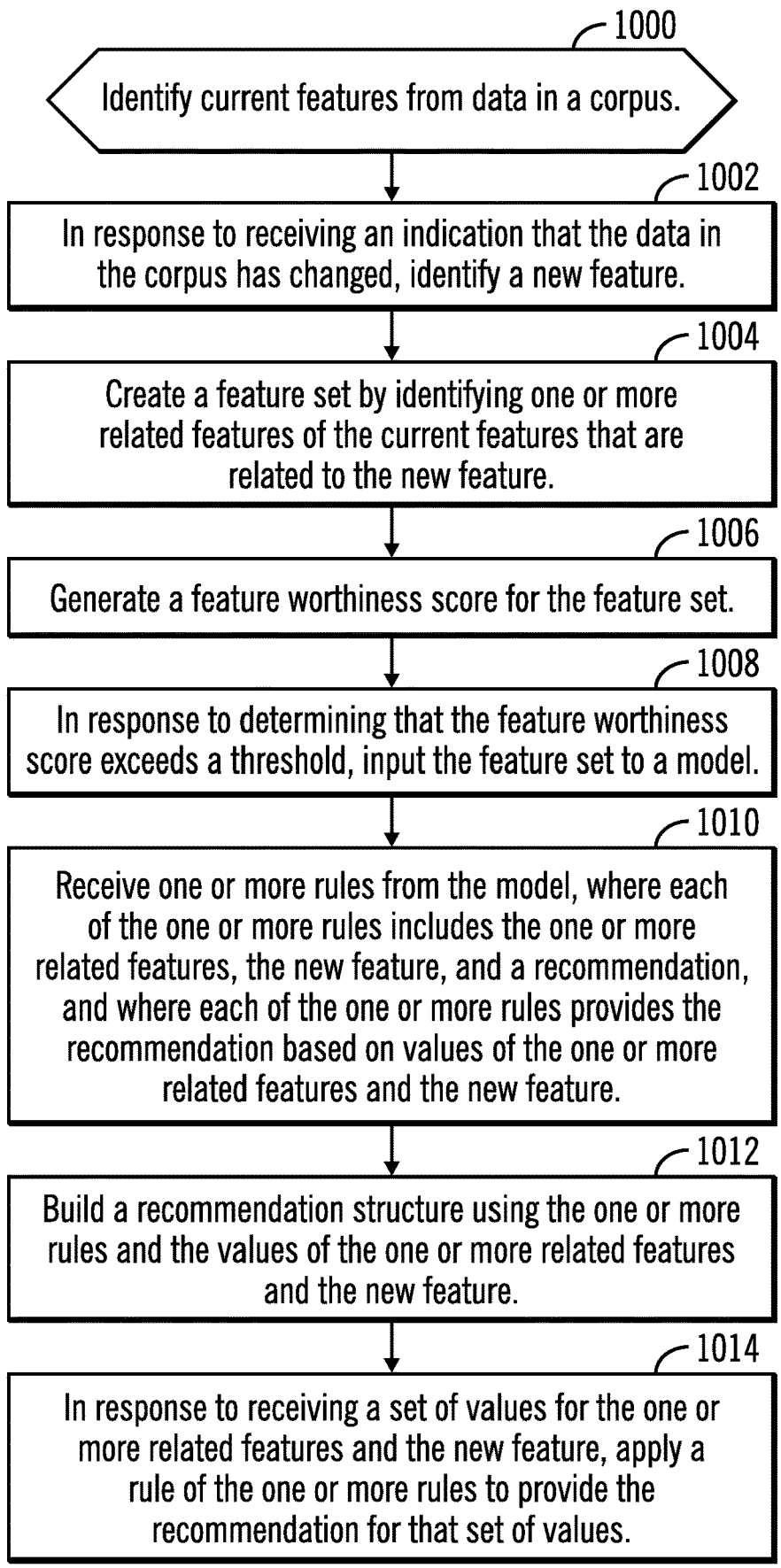
FIG. 10 illustrates, in a flowchart, operations for providing a recommendation in accordance with certain embodiments.

FIG. 10 illustrates, in a flowchart, operations for providing a recommendation in accordance with certain embodiments. Control begins at block 1000 with the rules generation engine 110 identifying current features from data in a corpus. In block 1002, in response to receiving an indication that the data in the corpus has changed, the rules generation engine 110 identifies a new feature. In block 1004, the rules generation engine 110 creates a feature set by identifying one or more related features of the current features that are related to the new feature. In block 1006, the rules generation engine 110 generates a feature worthiness score for the feature set. In certain embodiments, the feature worthiness score for the feature set is the sum of the individual feature worthiness scores for the features in the feature set.

In block 1008, in response to determining that the feature worthiness score exceeds a threshold, the rules generation engine 110 inputs the feature set to a model. In block 1010, the rules generation engine 110 receives one or more rules from the model, where each of the one or more rules includes the one or more related features, the new feature, and a recommendation, and where each of the one or more rules provides the recommendation based on values of the one or more related features and the new feature. In block 1012, the rules generation engine 110 builds a recommendation table using the one or more rules and the values of the one or more related features and the new feature. In block 1014, in response to receiving a set of values for the one or more related features and the new feature, the rules generation engine 110 applies a rule of the one or more rules to provide the recommendation for that set of values.

Figure 11:
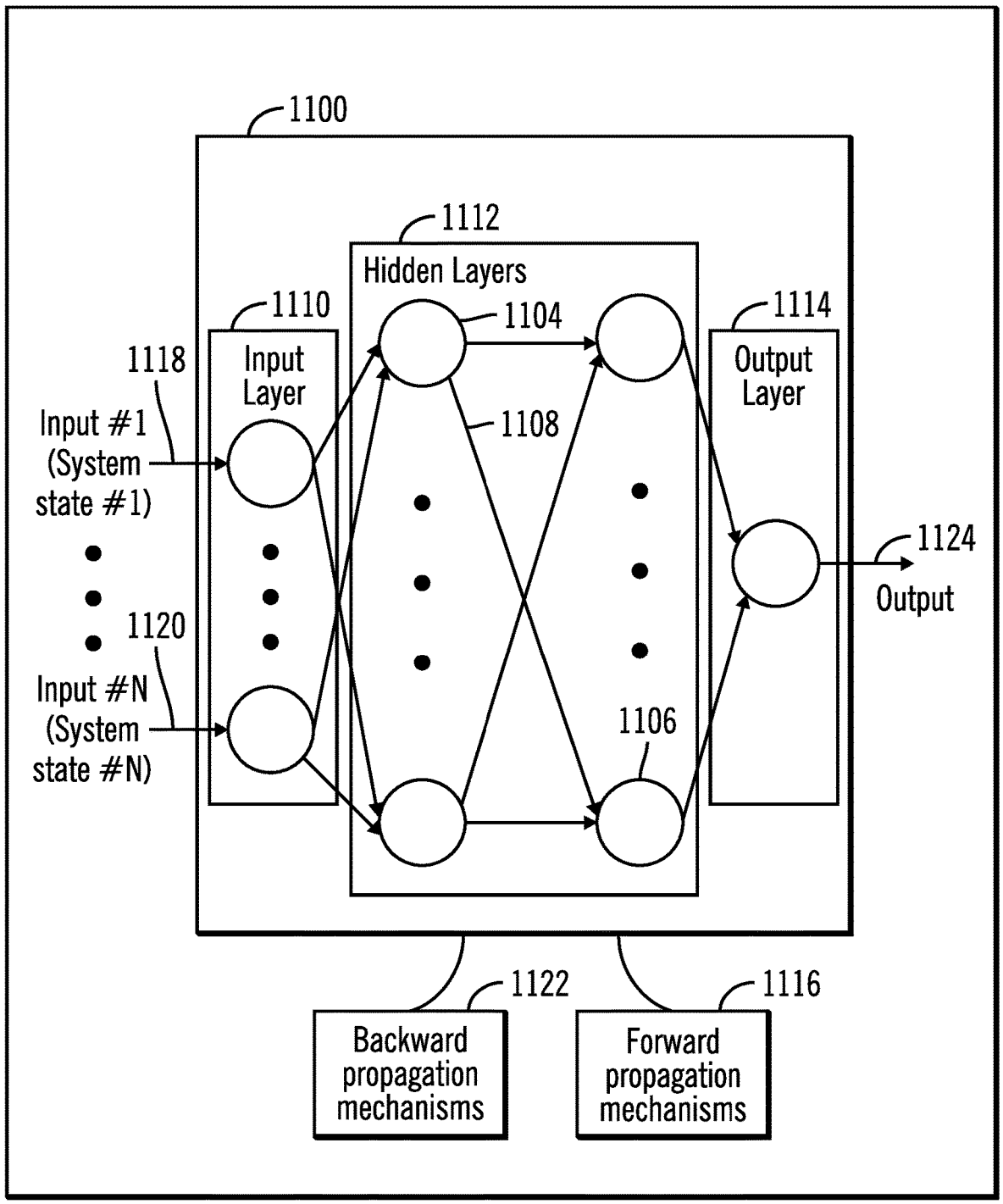
FIG. 11 illustrates, in a block diagram, details of a machine learning module in accordance with certain embodiments.

FIG. 11 illustrates, in a block diagram, details of a machine learning module 1100 in accordance with certain embodiments. In certain embodiments, the one or more models 130 are implemented using the components of the machine learning module 1100.

The machine learning module 1100 may comprise a neural network with a collection of nodes with links connecting them, where the links are referred to as connections. For example, FIG. 11 shows a node 1104 connected by a connection 1108 to the node 1106. The collection of nodes may be organized into three main parts: an input layer 1110, one or more hidden layers 1112, and an output layer 1114.

The connection between one node and another is represented by a number called a weight, where the weight may be either positive (if one node excites another) or negative (if one node suppresses or inhibits another). Training the machine learning module 1100 entails calibrating the weights in the machine learning module 1100 via mechanisms referred to as forward propagation 1116 and backward propagation 1122. Bias nodes that are not connected to any previous layer may also be maintained in the machine learning module 1100. A bias may be described as an extra input of 1 with a weight attached to it for a node.

In certain embodiments, the input data 1118 . . . 1120 are examples of inputs 240, and output 1124 is an example of output 1124.

In forward propagation 1116, a set of weights are applied to the input data 1118 . . . 320 to calculate the output 1124. For the first forward propagation, the set of weights may be selected randomly or set by, for example, a system administrator. That is, in the forward propagation 1116, embodiments apply a set of weights to the input data 1118 . . . 1120 and calculate an output 1124.

In backward propagation 1122 a measurement is made for a margin of error of the output 1124, and the weights are adjusted to decrease the error. Backward propagation 1122 compares the output that the machine learning module 1100 produces with the output that the machine learning module 1100 was meant to produce, and uses the difference between them to modify the weights of the connections between the nodes of the machine learning module 1100, starting from the output layer 1114 through the hidden layers 1112 to the input layer 1110, i.e., going backward in the machine learning module 1100. In time, backward propagation 1122 causes the machine learning module 1100 to learn, reducing the difference between actual and intended output to the point where the two come very close or coincide.

The machine learning module 1100 may be trained using backward propagation to adjust weights at nodes in a hidden layer to produce adjusted output values based on the provided inputs 240. A margin of error may be determined with respect to the actual output 1124 from the machine learning module 224 and an expected output to train the machine learning module 1100 to produce the desired output value based on a calculated expected output. In backward propagation, the margin of error of the output may be measured and the weights at nodes in the hidden layers 1112 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 1100 is configured to repeat both forward and backward propagation until the weights of the machine learning module 1100 are calibrated to accurately predict an output.

The machine learning module 1100 implements a machine learning technique such as decision tree learning, association rule learning, artificial neural network, inductive programming logic, support vector machines, Bayesian models, etc., to determine the output value 1124.

In certain machine learning module 1100 implementations, weights in a hidden layer of nodes may be assigned to these inputs to indicate their predictive quality in relation to other of the inputs based on training to reach the output value 1124.

With embodiments, the machine learning module 1100 is a neural network, which may be described as a collection of "neurons" with "synapses" connecting them.

With embodiments, there may be multiple hidden layers 1112, with the term "deep" learning implying multiple hidden layers. Hidden layers 1112 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 1116 and the backward propagation 1122.

In backward propagation 1122, embodiments measure the margin of error of the output and adjust the weights accordingly to decrease the error.

Neural networks repeat both forward and backward propagation until the weights are calibrated to accurately predict the output 1124.

In certain embodiments, the input to the machine learning module 1100 is a feature set including features, and the outputs of the machine learning module 1100 are rules with recommendations. In certain embodiments, the machine learning model may be refined based on whether the outputted recommendations, once taken, generate positive outcomes.

In various areas (e.g., banks, healthcare, travel approvals in companies, etc.), the decision-making process may be complex, difficult to manage, and time consuming. Even to curate the data points from different sources may be a cumbersome task done by subject matter experts manually. However, embodiments discover decision-making rules (patterns) and data points involved in the process by analyzing structured data, semi-structured data, and unstructured data. Then, the decision-making rules (patterns) are optimized to create a single workflow, which is then used to execute the process. At this point, the process has learned the paths to decisions and different possible outcomes. This information may further be used to build interactive systems where embodiments may ask the user for the data required for decision-making, follow the dynamic path driven by data, and explore all paths until reaching an outcome of a recommendation.

Embodiments are applicable to any domain or subject matter, such as education, manufacturing, agriculture, banking, healthcare, insurance, etc.

Embodiments are adaptable to changes that add a new feature (e.g., due to a change in a policy). Embodiments perform feature engineering, which may be described as building additional features out of existing data that is often spread across multiple related sources (e.g., tables). Embodiments solve classification and regression problems.

With embodiments, to train the model, the data may be prepared by subject matter experts. Then, embodiments may do feature engineering to extract relevant features for the model, generate a rule, and automate a process for making a decision by providing a recommendation based on values of features of the rule.

Also, embodiments are context-aware and knows what information should be present for desired outcomes. Embodiments use the context and understanding of decision-making rules (patterns) to dynamically derive a workflow (e.g., what should be done to make a decision) and decisions. Moreover, embodiments reduce the manual intervention and complexity of the decision making process by generating rules with recommendations.

Unlike conventional techniques that treat a model as a black box and cannot explain decisions, embodiments provide context. Unlike conventional techniques that need good quality data and can't work if only a few data attributes are available, embodiments are able to work with any type and amount of data. Unlike conventional techniques that are unable to request data or guide users and applications to obtain the right data for making decisions, embodiments are able to ask for data.

Unlike conventional techniques that are not context-aware and make decisions or select a workflow based on a subset of data, embodiments are context-aware and make decisions based on context.

Unlike conventional techniques that do not handle new features easily, embodiments are able to process new features.

That is, embodiments automatically learn the data points for the model, which will help in automating the entire decision-making process. Embodiments take into account new features related to changes that may affect the decision-making process. With embodiments, the model is an open box and adaptable.

Embodiments automate the process of finding features and processing data points by understanding the documents related to the context or a decision-making process. Also, embodiments manage the new features coming in conforming to any change.

Embodiments may be implemented using any programming language.

Figure 12:
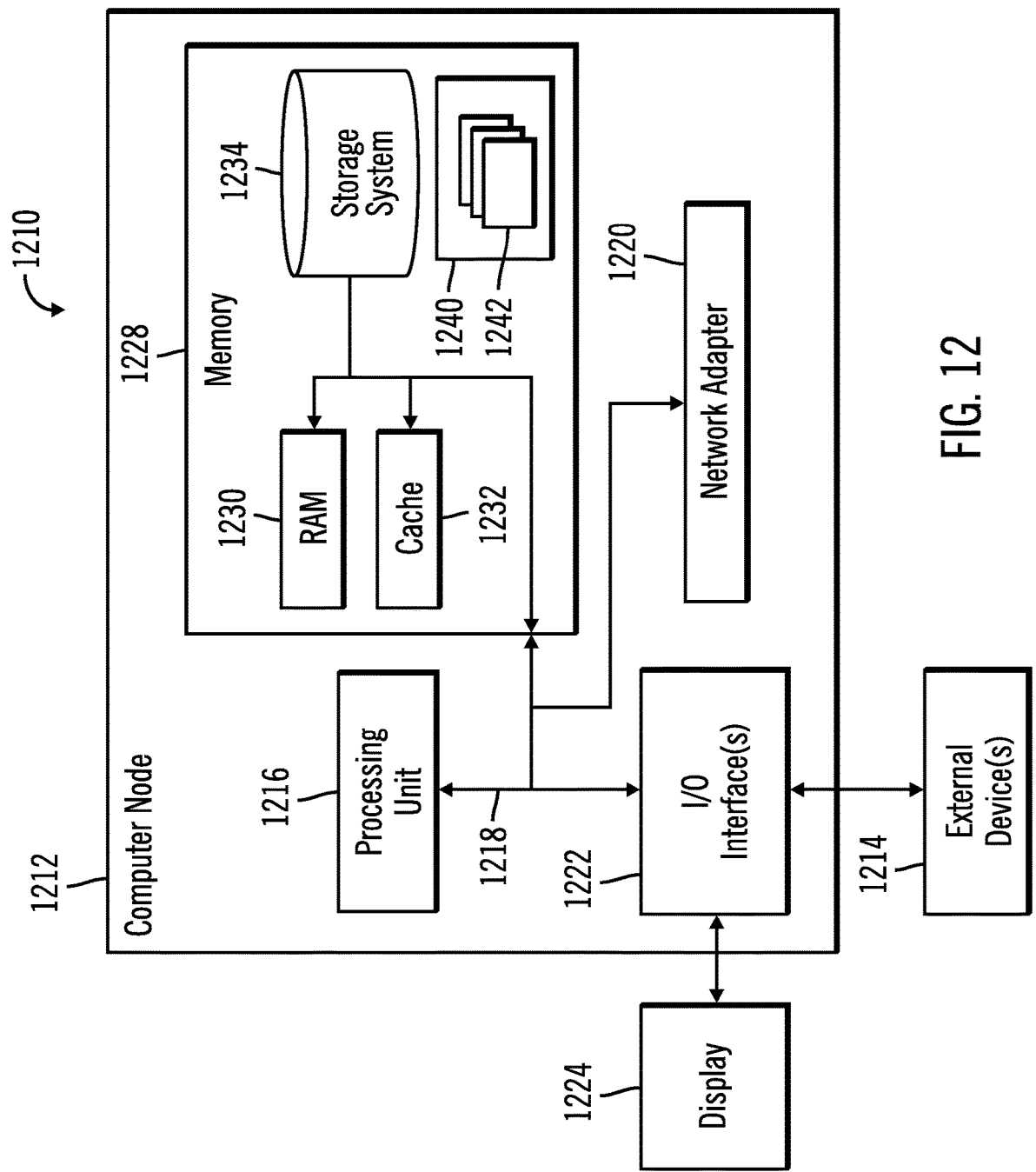
FIG. 12 illustrates a computing node in accordance with certain embodiments.

FIG. 12 illustrates a computing environment 1210 in accordance with certain embodiments. In certain embodiments, the computing environment is a cloud computing environment. Referring to FIG. 12, computer node 1212 is only one example of a suitable computing node and is not intended to suggest any limitation as to the scope of use or functionality of embodiments of the invention described herein. Regardless, computer node 1212 is capable of being implemented and/or performing any of the functionality set forth hereinabove.

The computer node 1212 may be a computer system, which is operational with numerous other general purpose or special purpose computing system environments or configurations. Examples of well-known computing systems, environments, and/or configurations that may be suitable for use with computer node 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1212 may be described in the general context of computer system executable instructions, such as program modules, being executed by a computer system. Generally, program modules may include routines, programs, objects, components, logic, data structures, and so on that perform particular tasks or implement particular abstract data types. Computer node 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer node 1212 is shown in the form of a general-purpose computing device. The components of computer node 1212 may include, but are not limited to, one or more processors or processing units 1216, a system memory 1228, and a bus 1218 that couples various system components including system memory 1228 to one or more processors or processing units 1216.

Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1212 typically includes a variety of computer system readable media. Such media may be any available media that is accessible by computer node 1212, and it includes both volatile and non-volatile media, removable and non-removable media.

System memory 1228 can include computer system readable media in the form of volatile memory, such as random access memory (RAM) 1230 and/or cache memory 1232. Computer node 1212 may further include other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1218 by one or more data media interfaces. As will be further depicted and described below, system memory 1228 may include at least one program product having a set (e.g., at least one) of program modules that are configured to carry out the functions of embodiments of the invention.

Program/utility 1240, having a set (at least one) of program modules 1242, may be stored in system memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer node 1212 may also communicate with one or more external devices 1214 such as a keyboard, a pointing device, a display 1224, etc.; one or more devices that enable a user to interact with computer node 1212; and/or any devices (e.g., network card, modem, etc.) that enable computer node 1212 to communicate with one or more other computing devices. Such communication can occur via Input/Output (I/O) interfaces 1222. Still yet, computer node 1212 can communicate with one or more networks such as a local area network (LAN), a general wide area network (WAN), and/or a public network (e.g., the Internet) via network adapter 1220. As depicted, network adapter 1220 communicates with the other components of computer node 1212 via bus 1218. It should be understood that although not shown, other hardware and/or software components could be used in conjunction with computer node 1212. Examples, include, but are not limited to: microcode, device drivers, redundant processing units, external disk drive arrays, RAID systems, tape drives, and data archival storage systems, etc.

In certain embodiments, the computing device 100 has the architecture of computer node 1212. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
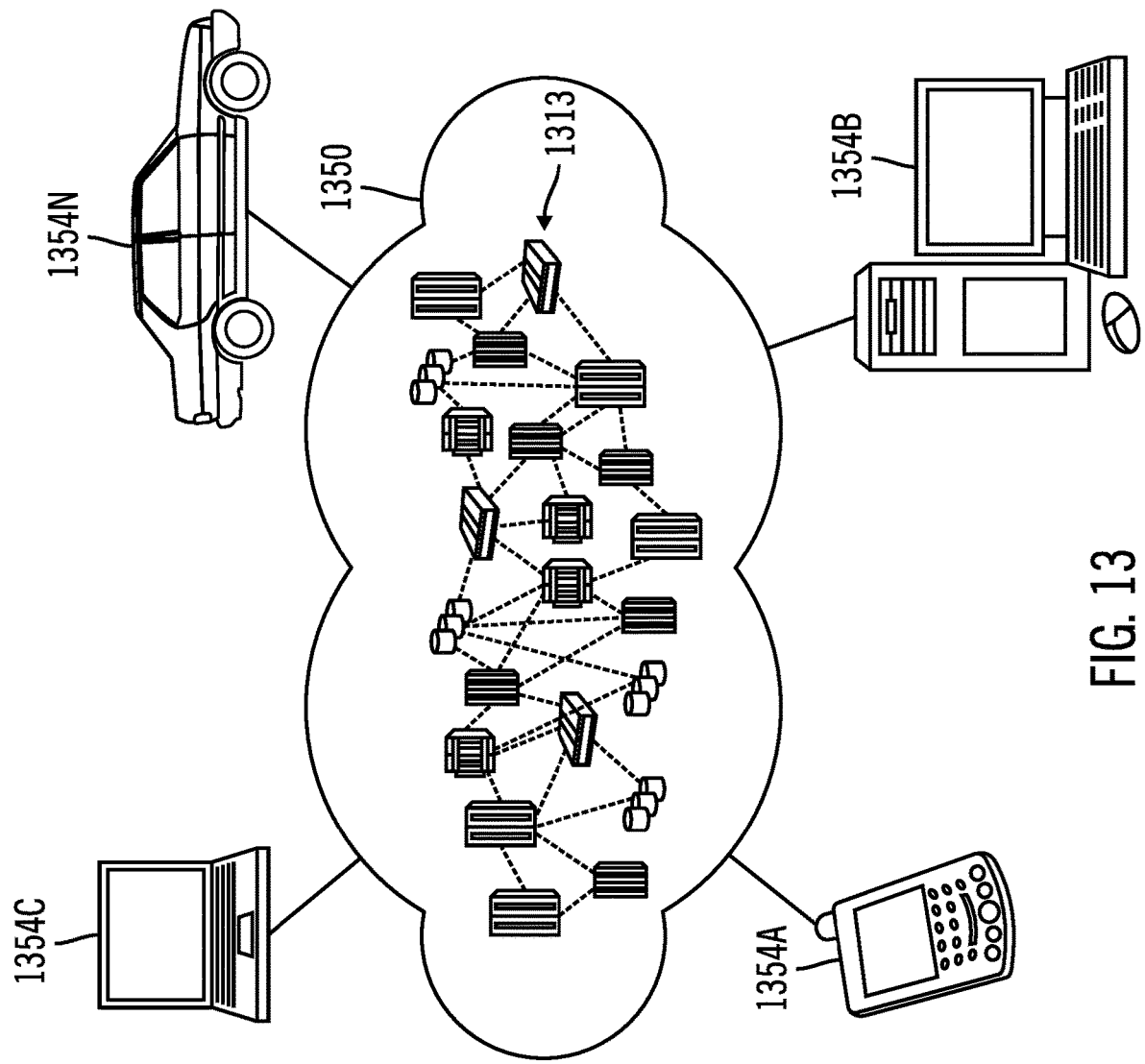
FIG. 13 illustrates a cloud computing environment in accordance with certain embodiments.

Referring now to FIG. 13, illustrative cloud computing environment 1320 is depicted. As shown, cloud computing environment 1320 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1320 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1320 can communicate with any type of computerized device over any type of network and/or network addressable connection (e.g., using a web browser).

Figure 14:
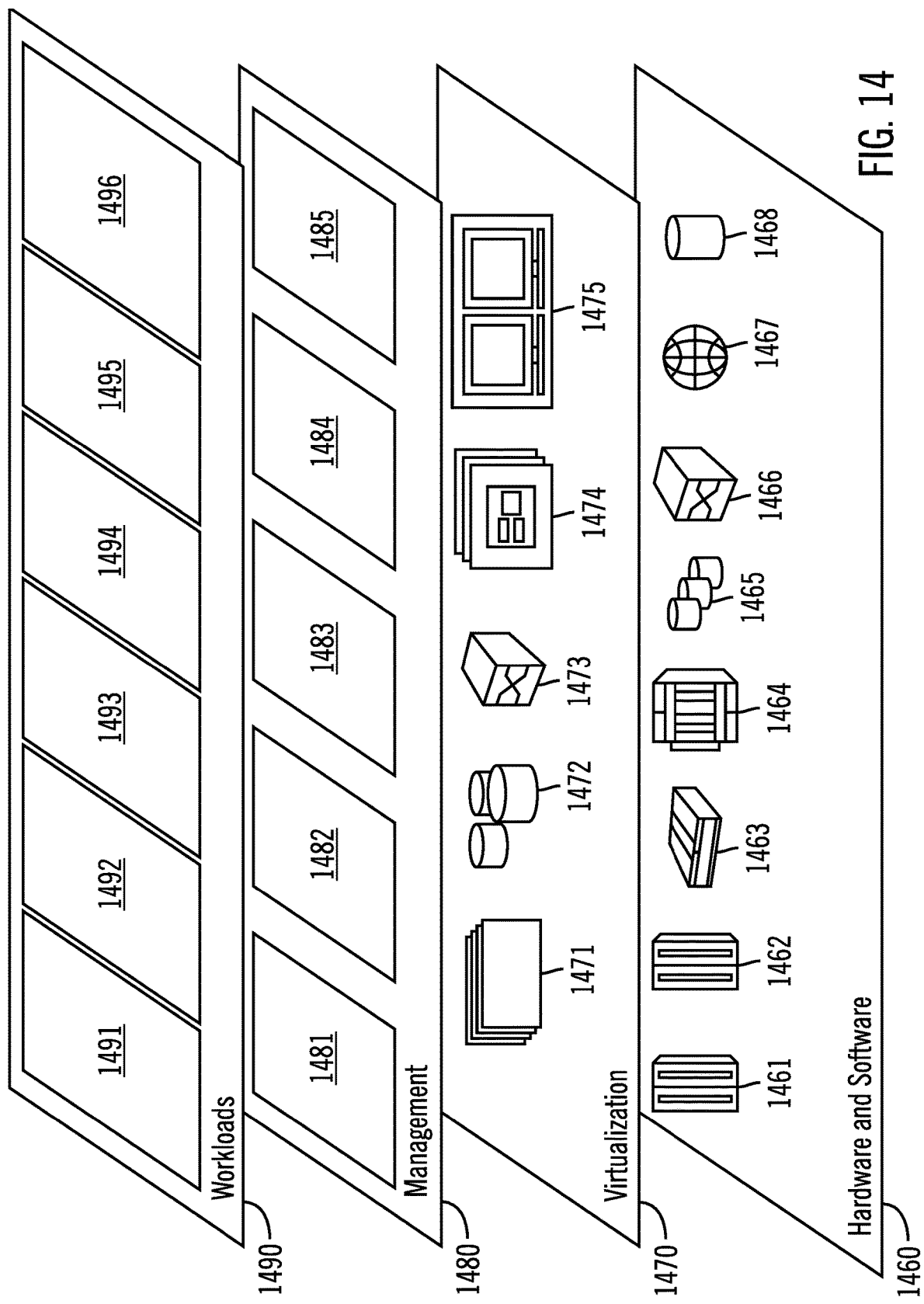
FIG. 14 illustrates abstraction model layers in accordance with certain embodiments.

Referring now to FIG. 14, a set of functional abstraction layers provided by cloud computing environment 1320 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and data analysis and rule generation for providing a recommendation 1496.

Thus, in certain embodiments, software or a program, implementing data analysis and rule generation for providing a recommendation in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    identifying current features from data in a corpus;
    building a recommendation structure from the current features, wherein the recommendation structure comprises a plurality of rules, and wherein each rule of the plurality of rules is associated with a recommendation;
    sending the recommendation structure to a model;
    in response to receiving an indication that the data in the corpus has changed, identifying a new feature;
    creating a feature set by identifying one or more related features comprising a subset of the current features in the corpus that are related to the new feature;
    generating a feature worthiness score for the feature set;
    in response to determining that the feature worthiness score exceeds a threshold, inputting the feature set to the model;
    receiving one or more rules of the plurality of rules from the model, wherein each rule of the one or more rules includes the one or more related features, the new feature, and an associated recommendation; and
    in response to receiving a set of values for the one or more related features and the new feature, applying a rule of the one or more rules to provide the recommendation for that set of values.

2. The computer-implemented method of claim 1, comprising further operations for:
    building a new recommendation structure using the one or more rules and the values of the one or more related features and the new feature.

3. The computer-implemented method of claim 1, comprising further operations for:
    building the corpus with the data, wherein the data comprises policy changes, new research, historical data, structured data, semi-structed data, and unstructured data.

4. The computer-implemented method of claim 1, wherein the current features are identified from a chat transcript, and wherein the model is trained using queries from the chat transcript.

5. The computer-implemented method of claim 1, comprising further operations for:
    associating a context with the feature set.

6. The computer-implemented method of claim 1, wherein the feature worthiness score for the feature set is a sum of individual feature scores for the new feature and the one or more related features, and wherein the individual feature scores are based on relevance, ranking, and rating.

7. The computer-implemented method of claim 1, wherein a Software as a Service (SaaS) is configured to perform the operations of the method.

8. A computer program product, the computer program product comprising a computer readable storage medium having program code embodied therewith, the program code executable by at least one processor to perform operations for:
    identifying current features from data in a corpus;
    building a recommendation structure from the current features, wherein the recommendation structure comprises a plurality of rules, and wherein each rule of the plurality of rules is associated with a recommendation;
    sending the recommendation structure to a model;
    in response to receiving an indication that the data in the corpus has changed, identifying a new feature;
    creating a feature set by identifying one or more related features comprising a subset of the current features in the corpus that are related to the new feature;
    generating a feature worthiness score for the feature set;
    in response to determining that the feature worthiness score exceeds a threshold, inputting the feature set to the model;
    receiving one or more rules of the plurality of rules from the model, wherein each rule of the one or more rules includes the one or more related features, the new feature, and an associated recommendation; and
    in response to receiving a set of values for the one or more related features and the new feature, applying a rule of the one or more rules to provide the recommendation for that set of values.

9. The computer program product of claim 8, wherein the program code is executable by at least one processor to perform operations for:
    building a new recommendation structure using the one or more rules and the values of the one or more related features and the new feature.

10. The computer program product of claim 8, wherein the program code is executable by at least one processor to perform operations for:
    building the corpus with the data, wherein the data comprises policy changes, new research, historical data, structured data, semi-structed data, and unstructured data.

11. The computer program product of claim 8, wherein the current features are identified from a chat transcript, and wherein the model is trained using queries from the chat transcript.

12. The computer program product of claim 8, wherein the program code is executable by at least one processor to perform operations for:
    associating a context with the feature set.

13. The computer program product of claim 8, wherein the feature worthiness score for the feature set is a sum of individual feature scores for the new feature and the one or more related features, and wherein the individual feature scores are based on relevance, ranking, and rating.

14. The computer program product of claim 8, wherein a Software as a Service (SaaS) is configured to perform the operations of the computer program product.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
identifying current features from data in a corpus;
building a recommendation structure from the current features, wherein the recommendation structure comprises a plurality of rules, and wherein each rule of the plurality of rules is associated with a recommendation;
sending the recommendation structure to a model;
in response to receiving an indication that the data in the corpus has changed, identifying a new feature;
creating a feature set by identifying one or more related features comprising a subset of the current features in the corpus that are related to the new feature;
generating a feature worthiness score for the feature set;
in response to determining that the feature worthiness score exceeds a threshold, inputting the feature set to the model;
receiving one or more rules of the plurality of rules from the model, wherein each rule of the one or more rules includes the one or more related features, the new feature, and an associated recommendation; and
in response to receiving a set of values for the one or more related features and the new feature, applying a rule of the one or more rules to provide the recommendation for that set of values.

16. The computer system of claim 15, wherein the operations further comprise:
building a new recommendation structure using the one or more rules and the values of the one or more related features and the new feature.

17. The computer system of claim 15, wherein the operations further comprise:
building the corpus with the data, wherein the data comprises policy changes, new research, historical data, structured data, semi-structed data, and unstructured data.

18. The computer system of claim 15, wherein the current features are identified from a chat transcript, and wherein the model is trained using queries from the chat transcript.

19. The computer system of claim 15, wherein the operations further comprise:
associating a context with the feature set.

20. The computer system of claim 15, wherein a Software as a Service (SaaS) is configured to perform the operations of the computer system.

* * * * *